United States Patent
Yu

(10) Patent No.: US 7,852,642 B2
(45) Date of Patent: Dec. 14, 2010

(54) FULL DIGITAL SOFT-START CIRCUIT AND POWER SUPPLY SYSTEM USING THE SAME

(75) Inventor: Wen-Hao Yu, Hsinchu County (TW)

(73) Assignee: Faraday Technology Corp., Science Based Industrial Park, Hsin-Chu (TW)

( * ) Notice: Subject to any disclaimer, the term of this patent is extended or adjusted under 35 U.S.C. 154(b) by 496 days.

(21) Appl. No.: 11/951,539

(22) Filed: Dec. 6, 2007

(65) Prior Publication Data
US 2009/0147550 A1    Jun. 11, 2009

(51) Int. Cl.
*H02M 7/10* (2006.01)
*G05F 1/10* (2006.01)

(52) U.S. Cl. .......................... 363/49; 323/283; 323/238; 323/241; 323/901

(58) Field of Classification Search .................. 323/238, 323/241, 273, 274, 283, 901, 284, 908; 363/49
See application file for complete search history.

(56) References Cited

U.S. PATENT DOCUMENTS

| | | | |
|---|---|---|---|
| 6,348,833 B1 | 2/2002 | Tsujimoto et al. | |
| 6,841,977 B2 | 1/2005 | Huang et al. | |
| 6,998,829 B2 | 2/2006 | Solie | |
| 7,002,330 B2 | 2/2006 | Kitani et al. | |
| 7,167,054 B1 * | 1/2007 | Dening et al. | 330/297 |
| 7,400,527 B2 * | 7/2008 | Wang | 365/185.03 |
| 7,459,891 B2 * | 12/2008 | Al-Shyoukh et al. | 323/274 |
| 7,586,297 B2 * | 9/2009 | Kitagawa | 323/282 |
| 2004/0022078 A1 * | 2/2004 | Shieh | 363/49 |

* cited by examiner

*Primary Examiner*—Jessica Han
(74) *Attorney, Agent, or Firm*—Winston Hsu; Scott Margo

(57) ABSTRACT

A full digital soft-start circuit adapted for a power supply system is provided. The full digital soft-start circuit includes a ring oscillator, a pulse generator, a counter, and a multiplexer. The ring oscillator generates a plurality of clock signals which are different in phase, while equivalent in duty cycle and frequency. The pulse generator generates a plurality of pulse signals with different duty cycles. The counter generates a multi-bit counting signal. The multiplexer determines whether to transmit the pulse signals generated by the pulse generator so as to generate an output pulse which becomes stable as time going on.

25 Claims, 13 Drawing Sheets

FULL DIGITAL SOFT-START CIRCUIT AND POWER SUPPLY SYSTEM USING THE SAME

BACKGROUND OF THE INVENTION

1. Field of the Invention

The present invention generally relates to a soft-start circuit, and particularly, to a full digital soft-start circuit workable under low power supply.

2. Description of Related Art

In a conventional power supply system which requires a pulse width modulation (PWM) scheme, a large inductance or a large capacitance is often needed for power storage or power conversion to boost or buck voltages. Typically, a soft-start circuit is usually employed in such a power supply system to protect components and internal circuitry from being damaged by high transient currents during initialization of the power supply system.

In a typical soft-start circuit for a conventional power supply system, a resistor capacitor loop is often introduced for the required output voltage. FIG. 1(a) is a schematic diagram of a conventional soft-start circuit. As shown in FIG. 1(a), the conventional soft-start circuit includes transistors 101 and 103, a resistor 102, a capacitor 104, and a comparator 105.

The transistor 101 includes a gate electrode connected to an enable signal ENB, a source electrode connected to a voltage supply, and a drain electrode connected to a first terminal of the resistor 102. The transistor 103 includes a gate electrode connected to the enable signal ENB, a source electrode coupled to GND, and a drain electrode connected to a second terminal of the resistor 102, a positive input terminal of the comparator 105, and a first terminal of the capacitor 104.

The first terminal of the resistor 102 is connected to the drain electrode of the transistor 101, and the second terminal of the resistor 102 is connected to the positive input terminal of the comparator 105, the drain electrode of the transistor 103, and the first terminal of the capacitor 104. The positive input terminal of the comparator 105 is connected to the first terminal of the capacitor 104, the first terminal of the resistor 102, and the drain electrode (which is also a node voltage VST) of the transistor 103. A negative input terminal of the comparator 105 receives a triangle signal TRI. The first terminal of the capacitor 104 is connected to the positive input terminal of the comparator 105, the second terminal of the resistor 102, and the drain electrode of the transistor 103. The second terminal of the capacitor 104 is connected to GND.

The comparator 105 compares the triangle signal TRI with the node voltage VST which is charged by the resistor 102 and the capacitor 104. As shown FIG. 1(b), when the triangle signal TRI is lower than the node voltage VST, an output signal EXT of the comparator 105 is at logic high level, and when the triangle signal TRI is higher than the node voltage VST, the output signal EXT of the comparator 105 is at logic low level. As time going on, the node voltage VST keeps ascending, so does a duty cycle of the output signal EXT.

In order to avoid large currents from damaging components and the circuitry during initialization of the power supply system, the node voltage VST must ascend slowly, and therefore the capacitance of the capacitor 104 should be about several μF. Further, this system requires analog circuits such as a triangle signal generator and a comparator 105, so that the soft-start circuit must be operated at an operation voltage higher than 1V for maintaining the normal operation.

As such, it is desirable to develop a soft-start circuit adapted to eliminate the disadvantage of the conventional technology that requires external capacitors.

It is also desirable to develop a full digital soft-start circuit without using external capacitors that can be obtained by complementary metal-oxide-semiconductor processes.

SUMMARY OF THE INVENTION

Accordingly, the present invention is directed to a full digital soft-start circuit, adapted for a power supply system. The soft-start circuit does not require external capacitors, and can be realized under CMOS processes.

According to an embodiment of the present invention, a full digital soft-start circuit is provided. The full digital soft-start circuit includes a ring oscillator, a pulse generator, a counter, and a multiplexer. The ring oscillator generates a plurality of clock signals which are different in phase, while equivalent in duty cycle and frequency. The pulse generator generates a plurality of pulse signals with different duty cycles. The counter generates a multi-bit counting signal. The multiplexer determines whether to transmit the pulse signals generated by the pulse generator so as to generate an output pulse which becomes stable as time going on.

According to another embodiment of the present invention, a power supply system is provided. The power supply system includes a full digital soft-start circuit, a voltage conversion module, a pulse generator, and a selector. The full digital soft-start circuit is operated under a reference voltage supply, and is adapted for generating an output pulse, which duty cycle changes as time going on. The full digital soft-start circuit is operated in response to an enable signal. The pulse generator is operated under an output voltage supply, and is adapted for generating a pulse width modulation (PWM) signal. When the power supply system initializes, the selector selects to transmit the output pulse generated by the full digital soft-start circuit voltage conversion module. The voltage conversion module generates an output voltage supply according to the output pulse. When the output voltage supply generated by the power conversion module is enough for normal operation of an internal analog circuit, e.g., the pulse generator, the selector selects to transmit the PWM signal generated by the pulse generator to the voltage conversion module.

According to still another embodiment of the present invention, another power supply system is provided. The power supply system includes digitally controlled power conversion circuit, a voltage conversion module, a selection mode signal generator, and a buffer. The digitally controlled power conversion circuit is adapted for generating an output pulse, which duty cycle changes as time going on. The voltage conversion module generates an output voltage supply according to the output pulse generated by the digitally controlled power conversion circuit. The selection mode signal generator is adapted for selecting an operation mode of the digitally controlled power conversion circuit. The buffer is coupled between the digitally controlled power conversion circuit and the voltage conversion module.

According to a further embodiment of the present invention, still another power supply system is provided. The power supply system includes a full digital soft-start circuit, a voltage conversion module, a voltage regulator, and an enable signal generator. The full digital soft-start circuit is operated under a reference voltage supply, and is adapted for generating an output pulse, which duty cycle changes as time going on. The voltage regulator is operated under an output voltage supply, and is adapted for generating a bias signal. The enable signal generator is adapted to generate an enable signal for controlling the full digital soft-start circuit. When the output voltage supply doesn't reach the good voltage level, the voltage conversion module converts the reference voltage supply to the output voltage supply according to the output pulse generated by the full digital soft-start circuit. When the output voltage supply becomes as good as operating, the voltage conversion module is changed, while the bias signal generated by the voltage regulator adjusts the voltage conversion module, and the voltage conversion module converts the reference voltage supply to the output voltage supply.

Embodiments of the present invention improves the disadvantage of conventional power supply systems on requiring an external capacitor and an analog voltage supply by adopting full digital structure. Embodiments of the present invention may be accomplished by CMOS processes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
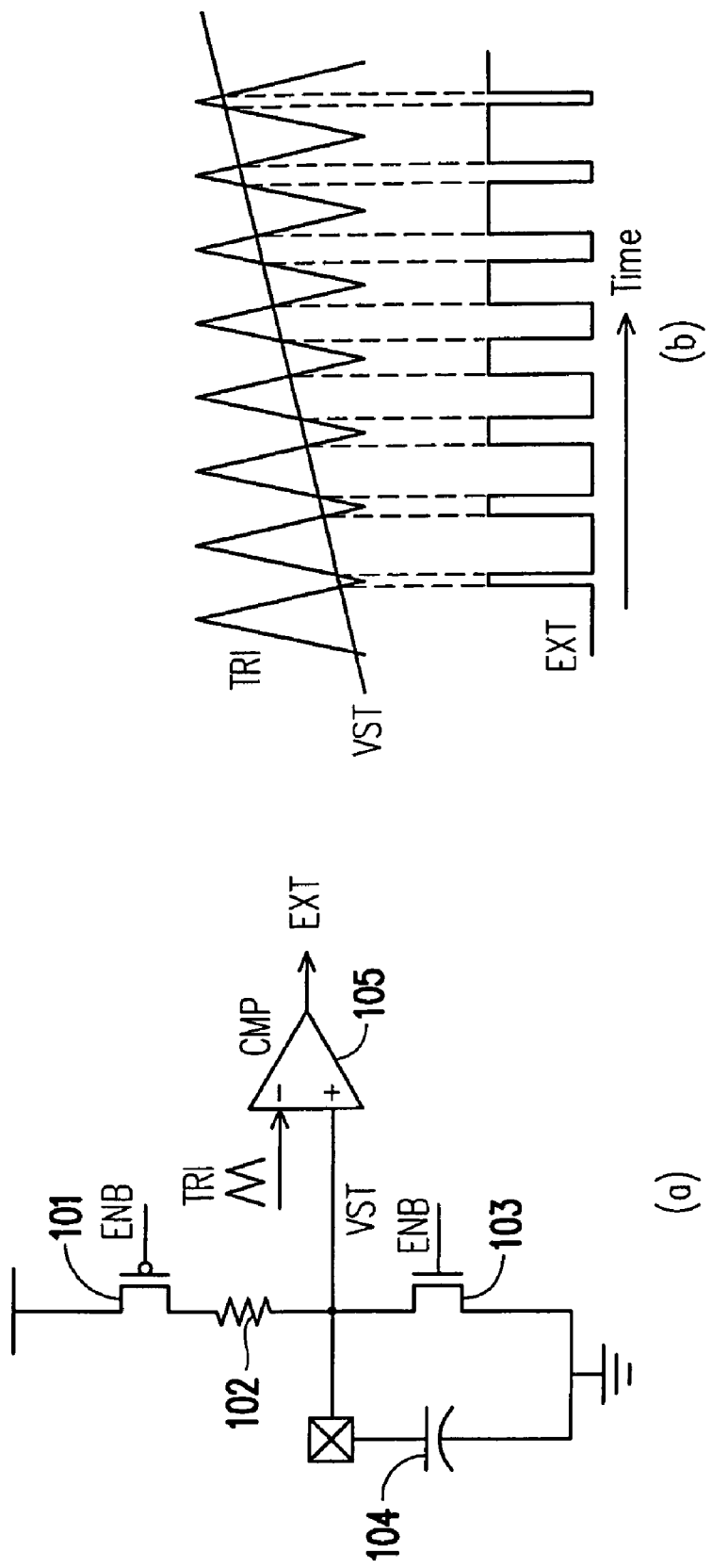
FIGS. 1(a) and 1(b) are respectively a circuit diagram of a conventional soft-start circuit and a duty cycle waveform diagram thereof.

Reference will now be made in detail to the present preferred embodiments of the invention, examples of which are illustrated in the accompanying drawings. Wherever possible, the same reference numbers are used in the drawings and the description to refer to the same or like parts.

According to an embodiment of the present invention, a full digital module is employed for achieving a soft-start circuit so as to eliminate the disadvantage of conventional technologies on requiring external capacitors and high operation voltage.

Figure 2:
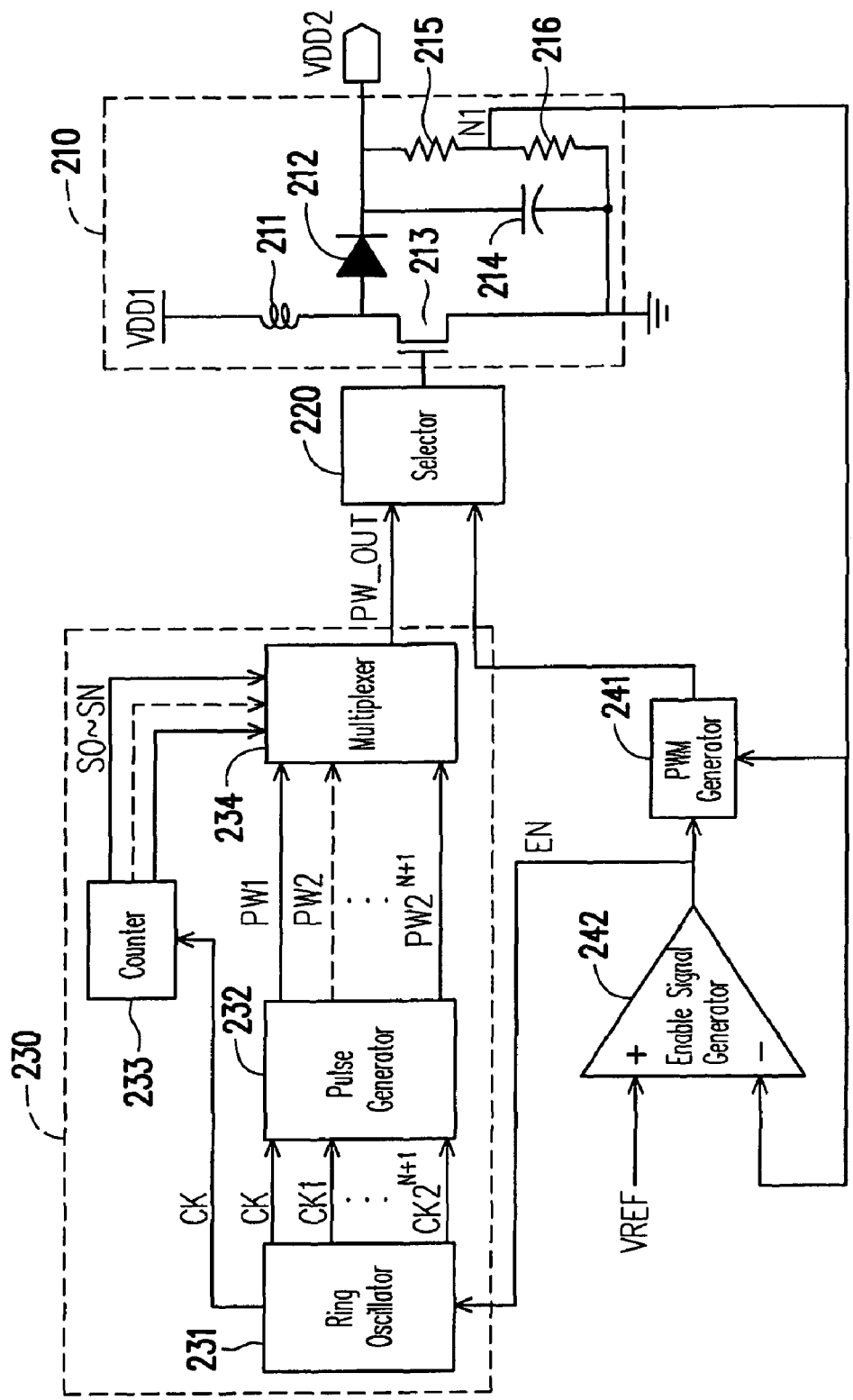
FIG. 2 is a circuit block diagram illustrating a power supply system according to an embodiment of the present invention.

Referring to FIG. 2, there is shown a block diagram illustrating a power supply system according to an embodiment of the present invention. The power supply system includes a power conversion module 210, a selector 220, a soft-start circuit 230, a PWM generator 241, and an enable signal generator 242.

When the power supply system starts or initializes, the selector 220 selects to transmit an output pulse generated by the soft-start circuit 230 to the voltage conversion module 210. The voltage conversion module 210 generates an output voltage supply VDD2 accordingly. It should be noted that the output voltage supply VDD2 is not yet good for operating during initialization. When the output voltage supply VDD2 generated by the power conversion module 210 becomes as high for operating, the selector 220 selects to transmit a PWM signal generated by the PWM generator 241 to the voltage conversion module 210, so that the voltage conversion module 210 may provide the stable output voltage supply VDD2.

As shown in FIG. 2, the voltage conversion module 210 includes an inductor 211, a diode 212, a transistor 213, a capacitor 214, and resistors 215, 216. The inductor 211 includes a first terminal coupled to a voltage supply VDD1, and a second terminal coupled to an anode of the diode 212 and a drain electrode of the transistor 213. The anode of the diode 212 is further coupled to the second terminal of the inductor 211 and the drain electrode of the transistor 213. The diode 212 further includes a cathode coupled to the output voltage supply VDD2, a first terminal of the capacitor 214 and a first terminal of the resistor 215. A gate electrode of the transistor 213 is coupled to an output terminal of the selector 220. The drain electrode of the transistor 213 is coupled to the second terminal of the inductor 211 and the anode of the diode 212. A source electrode of the transistor 213 is coupled to GND. The first terminal of the capacitor 214 is connected to the cathode of the diode 212, the first terminal of the resistor 215, and the output voltage supply VDD2. A second terminal of the capacitor 214 is coupled to GND. The first terminal of the resistor 215 is coupled to the first terminal of the capacitor 214, the cathode of the diode 212, and the output voltage supply VDD2. A second terminal of the resistor 215 is coupled to a first terminal of the resistor 216. The first terminal of the resistor 216 is coupled to the second terminal of the resistor 215, and a second terminal of the resistor 216 is coupled to GND.

In the voltage conversion module 210, the resistors 215 and 216 serve as a voltage divider. After voltage division, a node voltage N1 is coupled to a negative input terminal of the enable signal generator 242 and an input terminal of the PWM generator 241. A reference voltage VREF is inputted into a positive input terminal of the enable signal generator 242, and an enable signal EN is generated at the output terminal of the enable signal generator 242. The enable signal EN is then transmitted to a ring oscillator 231 of the soft-start circuit 230. Such an enable signal EN is adapted for controlling the soft-start circuit 230 to operate under normal operation or OFF mode.

The output voltage supply VDD2 generated by the voltage conversion module 210 serves as an operation voltage supply for the PWM generator 241 and the enable signal generator 242. The PWM generator 241 generates PWM signals and transmits the PWM signals to the selector 220. According to the embodiment of the present invention, the PWM generator 241 is required to be able to generate PWM signals while the structure thereof is not to be restricted.

The soft-start circuit 230 is operated under the voltage supply VDD1, for generating pulse signals PW_OUT. The pulse signals PW_OUT is adapted to change its duty cycle as time going on. The soft-start circuit 230 is illustrated as shown in FIG. 2, including a ring oscillator 231, a pulse generator 232, a counter 233, and a multiplexer 234.

The ring oscillator 231 is adapted for generating a plurality of clock signals CK, CK1, . . . , and $CK2^{N+1}$, which are different in phase while equivalent in duty cycle, according to an enable signal EN. The clock signals CK, CK1, . . . , $CK2^{N+1}$ have the same frequency. The pulse generator 232 is coupled to the ring oscillator 231, and performs digital logical operation according to the clock signals CK, CK1, . . . , and $CK2^{N+1}$ generated by the ring oscillator 231, so as to generate pulse signals PW1, PW2, . . . , $PW2^{N+1}$, which have different duty cycles.

The counter 233 is coupled to the ring oscillator 231, and counts according to the clock signals CK generated by the ring oscillator 231, so as to generate (N+1)-bit signals S0~SN. The counter 233 is adapted to affect a soft-starting time of the soft-start circuit 230. The multiplexer 234 is coupled between the pulse generator 232 and the counter 233. The multiplexer 234 determines whether to transmit the pulse signals PW1, PW2, ..., PW2$^{N+1}$ generated by the pulse generator 232, according to the (N+1)-bit signals S0~SN. In such a way, an output pulse signal PW_OUT which duty cycle increases as time going on can be obtained.

Figure 3A:
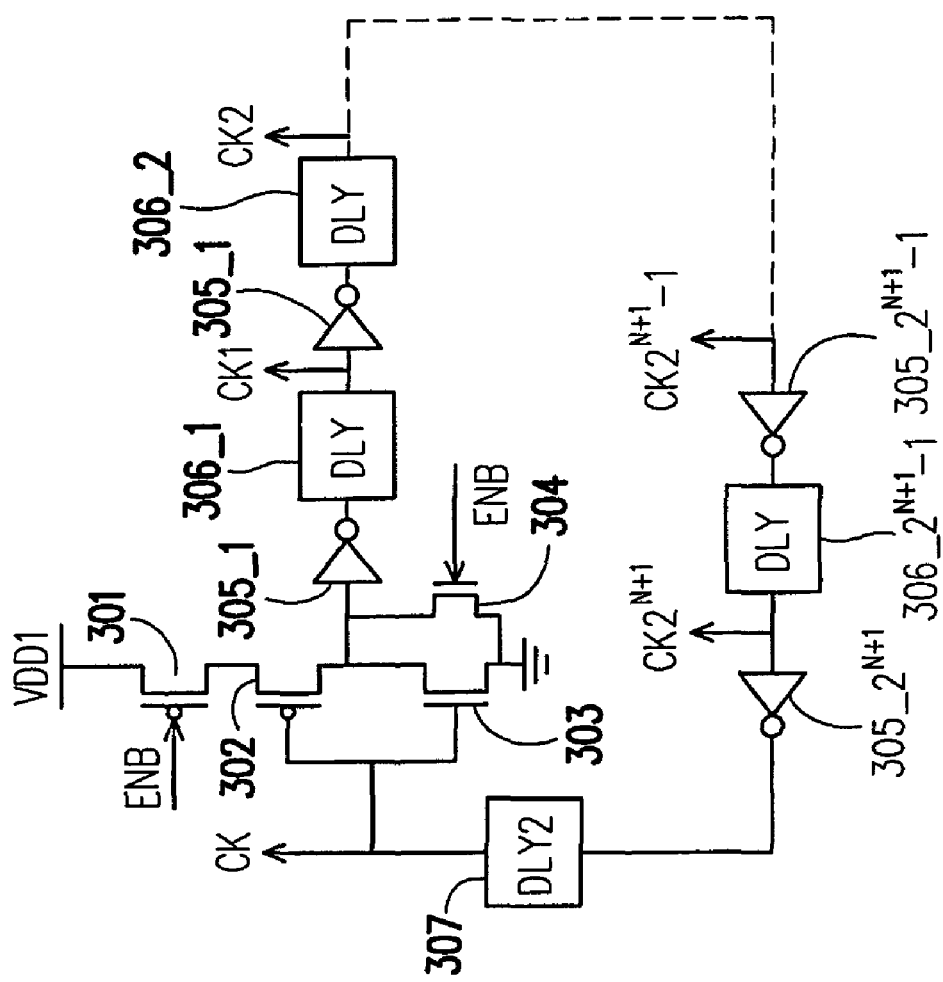
FIGS. 3A and 3B are possible structures of a ring oscillator.

Referring to FIG. 3A, there is shown the ring oscillator 231. The ring oscillator 231 includes transistors 301 through 304, a plurality of inverters 305, a plurality of delay units 306, and a delay unit 307.

The transistor 301 includes a source electrode coupled to the voltage supply VDD1, a gate electrode coupled to an enable signal ENB (which is an inverted signal of the enable signal EN), and a drain electrode coupled to a source electrode of the transistor 302.

The transistor 302 further includes a gate electrode coupled to a gate electrode of the transistor 303 and an output signal terminal of the delay unit 307, a source electrode coupled to the drain electrode of the transistor 301, and a drain electrode coupled to an input terminal of the inverter 305_1 and source electrodes of the transistors 303, 304.

The transistors 303 and 304 are parallel connected. Source electrodes of the transistors 303 and 304 are coupled to GND. A gate electrode of the transistor 304 is connected to the enable signal ENB. A gate electrode of the transistor 303 is coupled to the gate electrode of the transistor 302 and an output signal terminal of the delay unit 307. Drain electrodes of the transistors 303 and 304 are connected to the input terminal of the inverter 305_1 and the drain electrode of the transistor 302.

Figure 5:
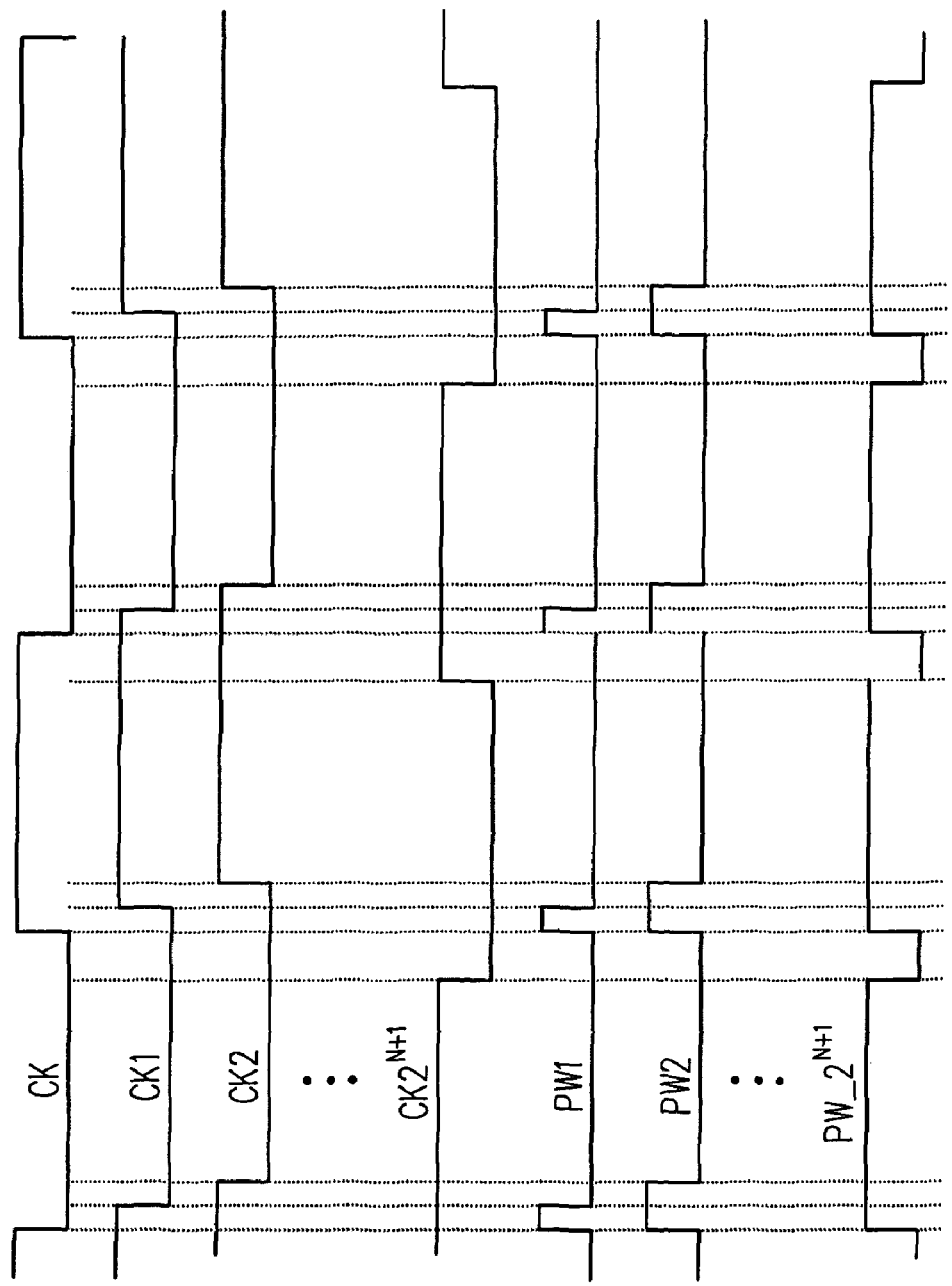
FIG. 5 illustrates clock signals and pulse signals generated by the ring oscillator and the pulse generator, respectively.

The input terminal of the inverter 305_1 is connected to the drain electrodes of the transistors 302, 303, and 304, and an output terminal of the inverter 305_1 is connected to an input terminal of the delay unit 306_1. An output terminal of the delay unit 306_1 outputs the clock signal CK1. The clock signal CK1 has different phase with the clock signal CK, as shown in FIG. 5. Likewise, clocks signals CK2, ..., CK2$^{N+1}$ outputted from the delay units 306_2..., 306_2$^{N+1}$ all have different phases from another, while have the same frequency. The inverter 305_2$^{N+1}$ is coupled to the delay unit 307 and the gate electrodes of the transistors 302, 303, and outputs the clock signal CK. The clock signals CK, CK1, ..., CK2$^{N+1}$ are as illustrated in FIG. 5.

Further, the transistors 301 through 304 perform an enabling operation, and function as an inverter. These delay units can also be realized with inverters having a delay function.

Figure 3B:
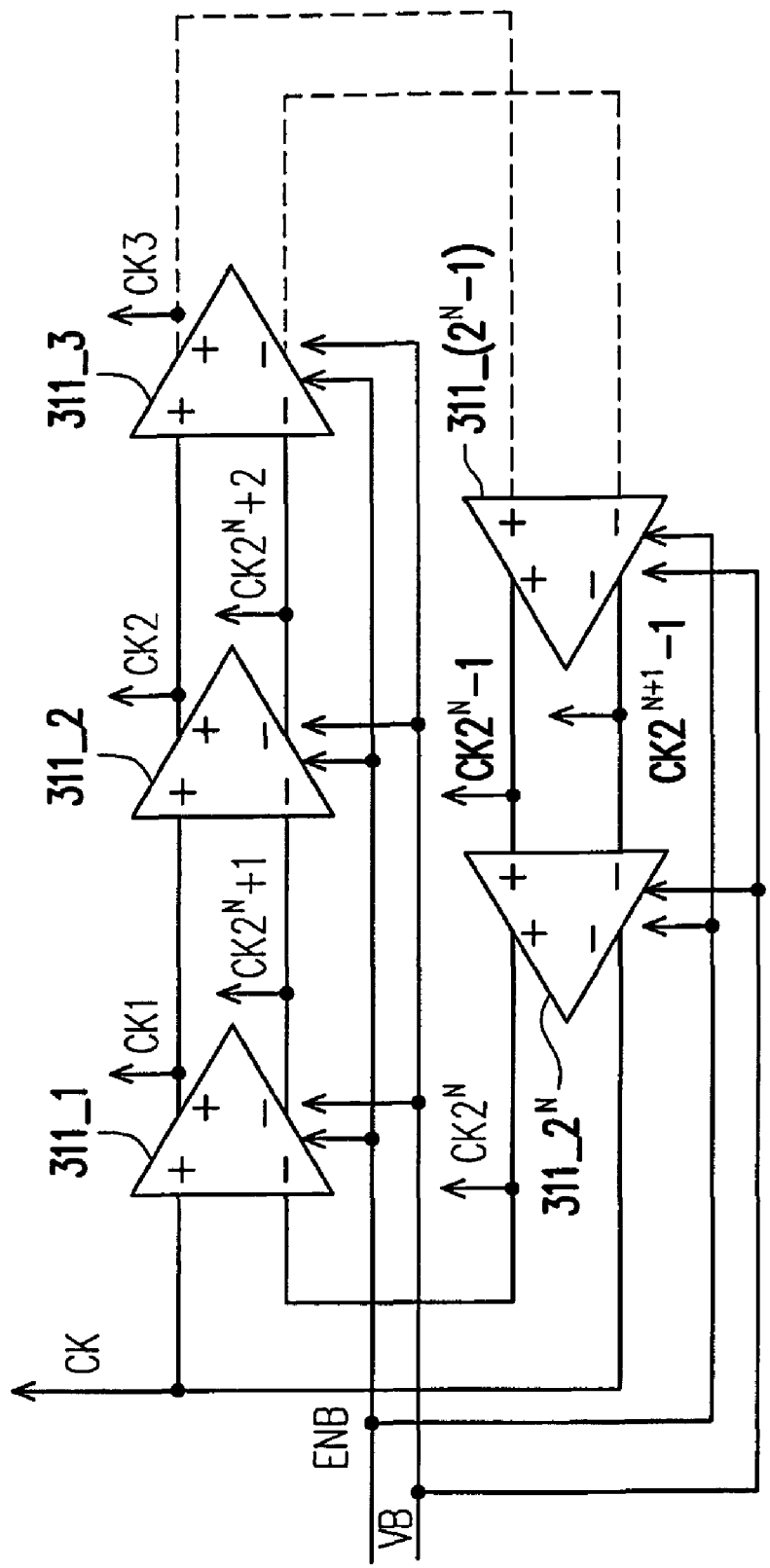

FIG. 3B illustrates another structure of the ring oscillator 231 according to an embodiment of the present invention. In FIG. 3A, the ring oscillator 231 includes a single-end output inverter. However, in FIG. 3B, the ring oscillator 231 otherwise includes differential signal output inverters, and the frequency of the ring oscillator 231 is controlled by a voltage VB.

As shown in FIG. 3B, the ring oscillator 231 includes a plurality of differential signal output inverters 311_1 through 311_2$^N$. A positive input terminal and a negative input terminal of the inverter 311_1 receive the clock signals CK and CK2$^N$, respectively. A positive output terminal and a negative output terminal of the inverter 311_1 output the clock signals CK1 and CK2$^{N+1}$, respectively.

Figure 4:
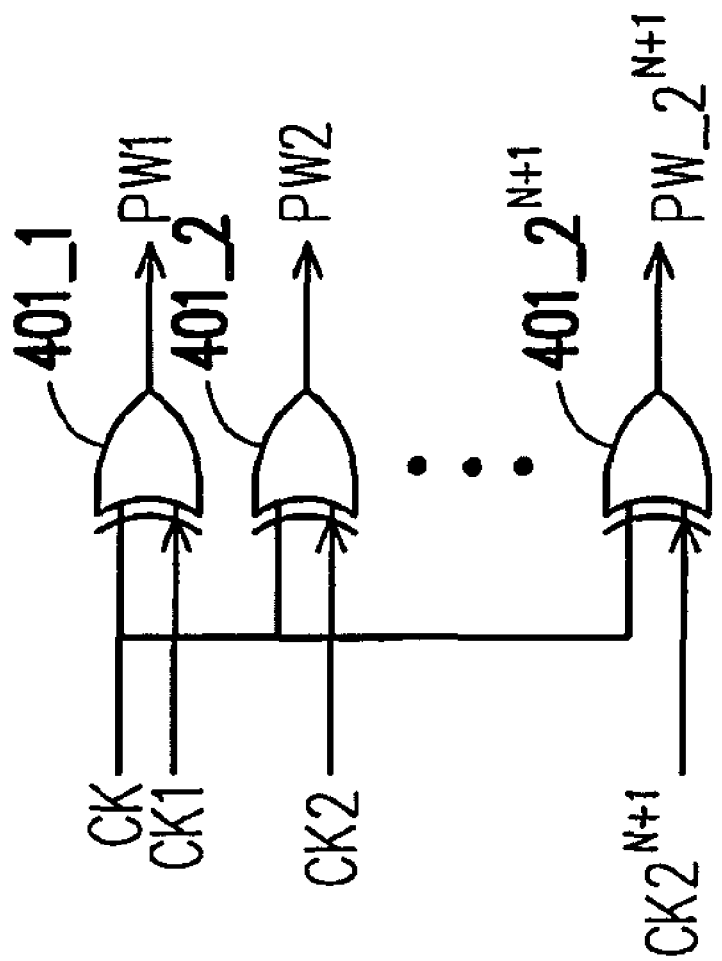
FIG. 4 is circuit diagram of a pulse generator.

The pulse generator 232 has a structure as shown in FIG. 4. Pulse signal PW1 is generated by performing an exclusive OR logical operation on the clock signals CK and CK1 by an exclusive OR logic gate 401_1. Pulse signal PW2 is generated by performing an exclusive OR logical operation on the clock signals CK and CK2 by an exclusive OR logic gate 401_2. In such a way, pulse signals PW1, PW2, ..., PW2$^{N+1}$ as shown in FIG. 5 can be obtained.

Figure 6:
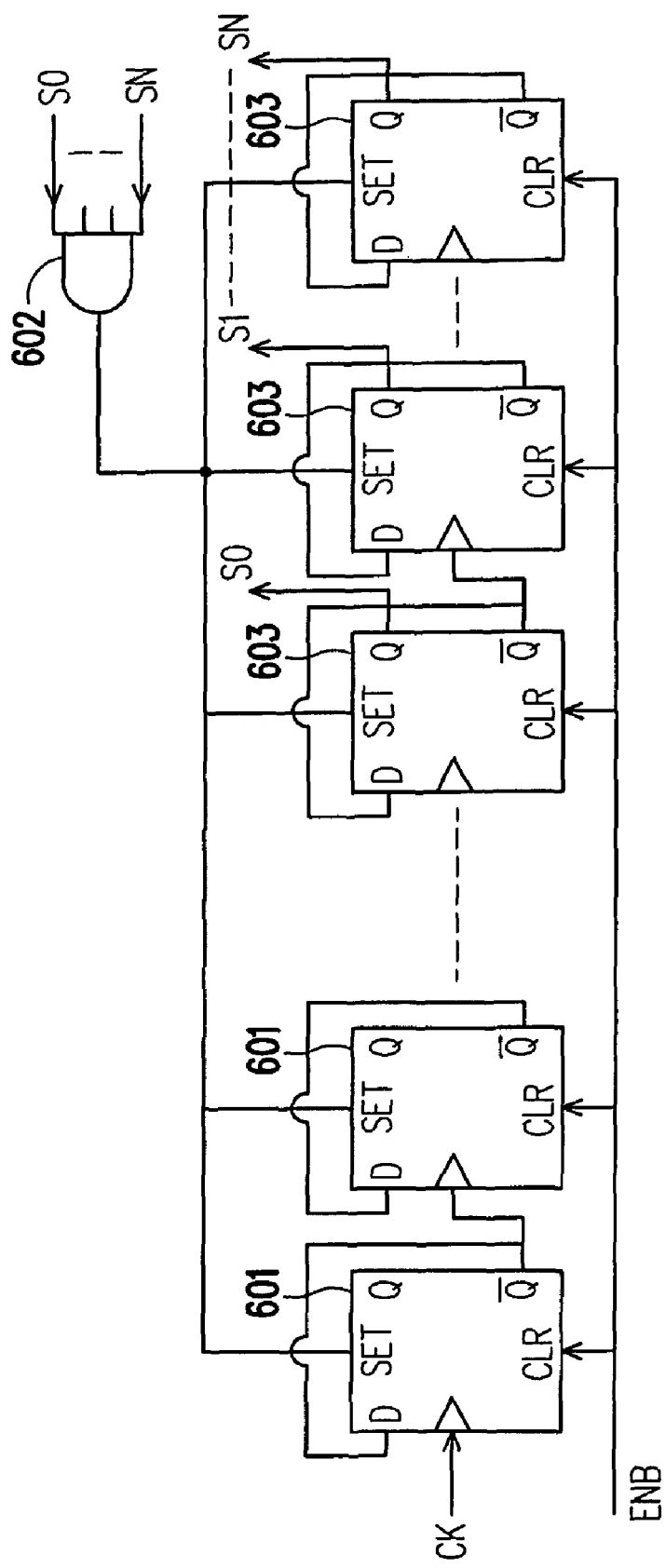
FIG. 6 is a circuit diagram of a counter.

The counter 233 counts the clock signal CK generated by the ring oscillator 231, and therefore generates (N+1)-bit signals S0~SN. As shown in FIG. 6, the counter 233 includes a plurality of flip-flops 601, a plurality of flip-flops 603, and an AND gate 602.

Figure 7:
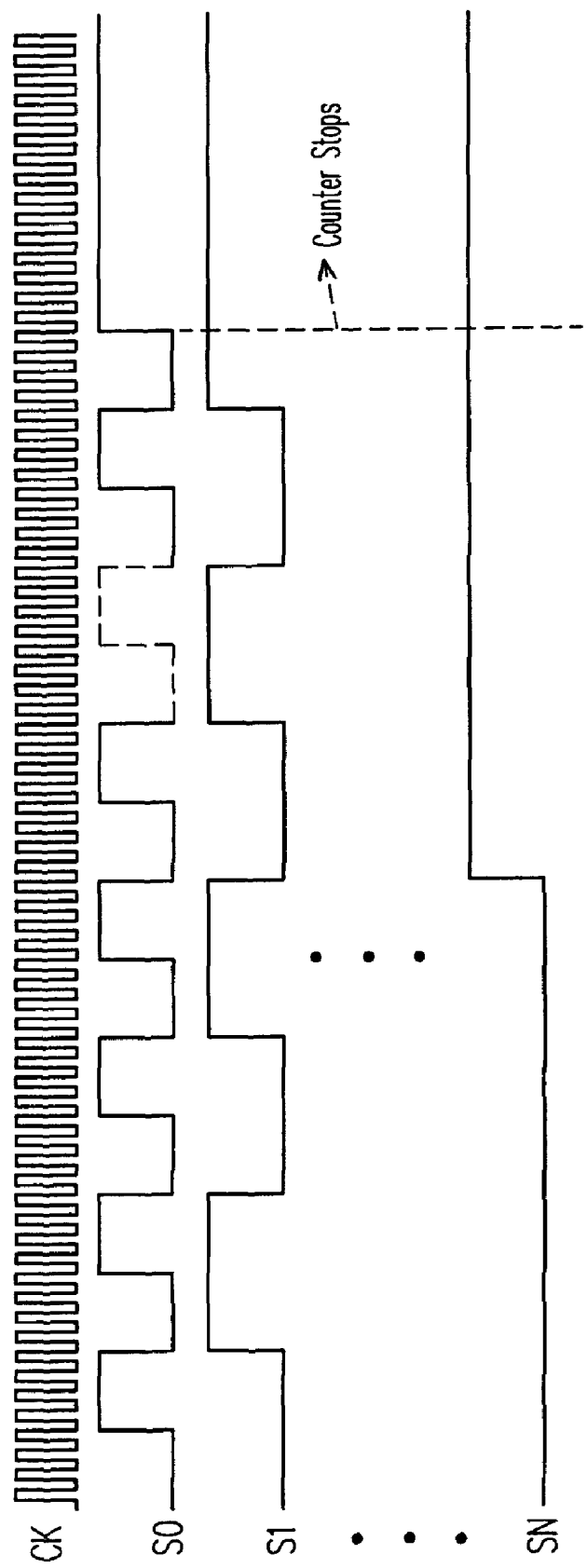
FIG. 7 illustrates a waveform of N+1 bit signals generated by the counter.

A quantity of the flip-flops 601 affects a counting cycle of the counter 233, as well as a pulse width of the signals S0 through SN. The flip-flops 603 are adapted for generating the (N+1)-bit signals S0~SN, which waveforms are as shown in FIG. 7.

The AND gate 602 includes input terminals receiving the (N+1)-bit signals S0~SN, and an output terminal coupled to set terminals SEL of all of the flip-flops 603. When all of the signals S0 through SN are logic high, the AND gate 602 sustains the signals S0 through SN at logic high, as shown in "counter stops" in FIG. 7.

Figure 8:
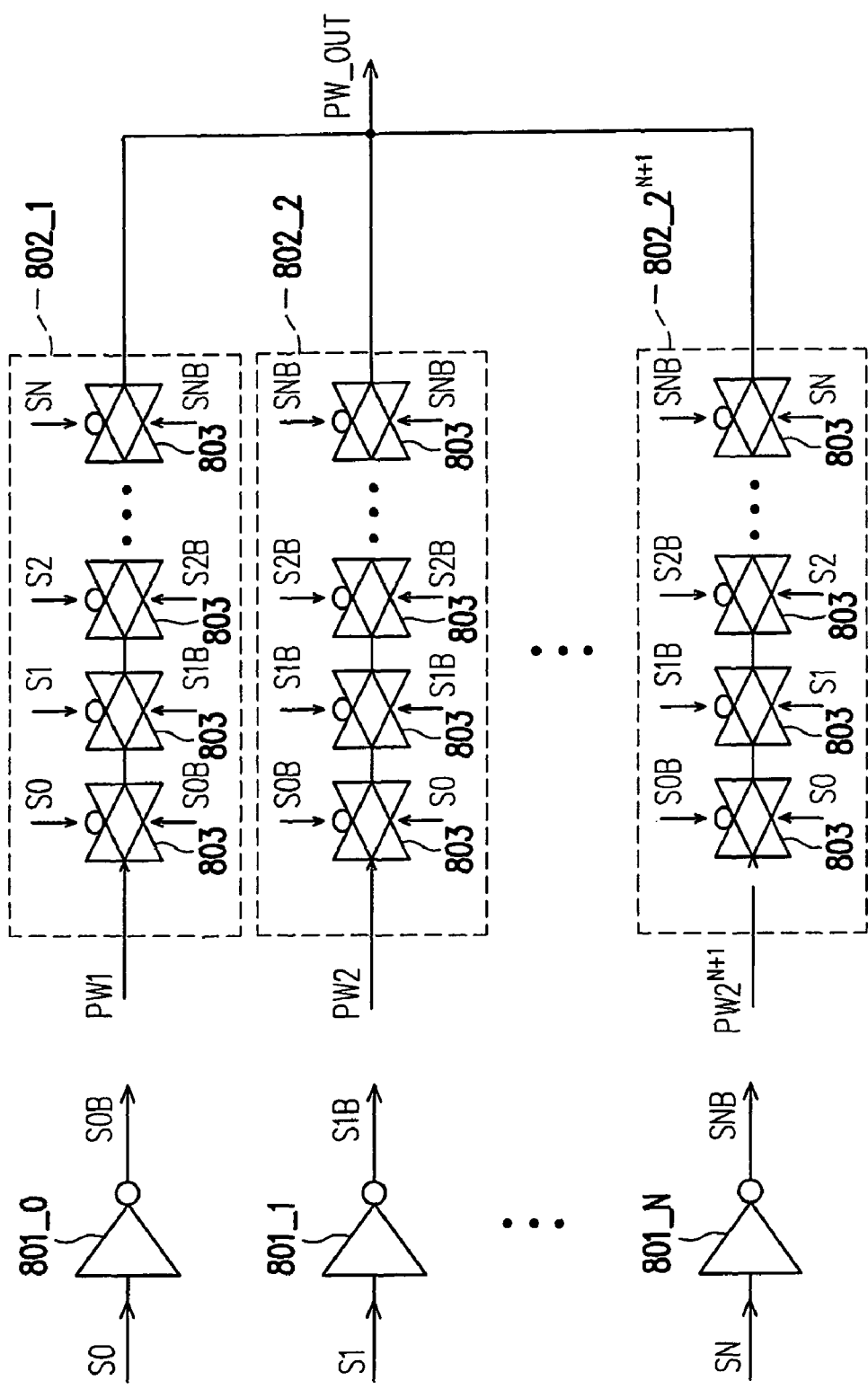
FIG. 8 is a schematic diagram illustrating a multiplexer.

The multiplexer 234 includes 2$^{N+1}$ switches 802_1 through 802_2$^{N+1}$, and N+1 inverters 801_0 through 801_N, as shown in FIG. 8. Each of the switches 802_1 through 802_2$^{N+1}$ for example includes a plurality of transmission gates 803. However, the present invention is not restricted by this. Input terminals of the inverters 801_0 through 801_N are coupled to the signals S0 through SN and signals S0B, S1B, ..., SNB, correspondingly.

Figure 9:
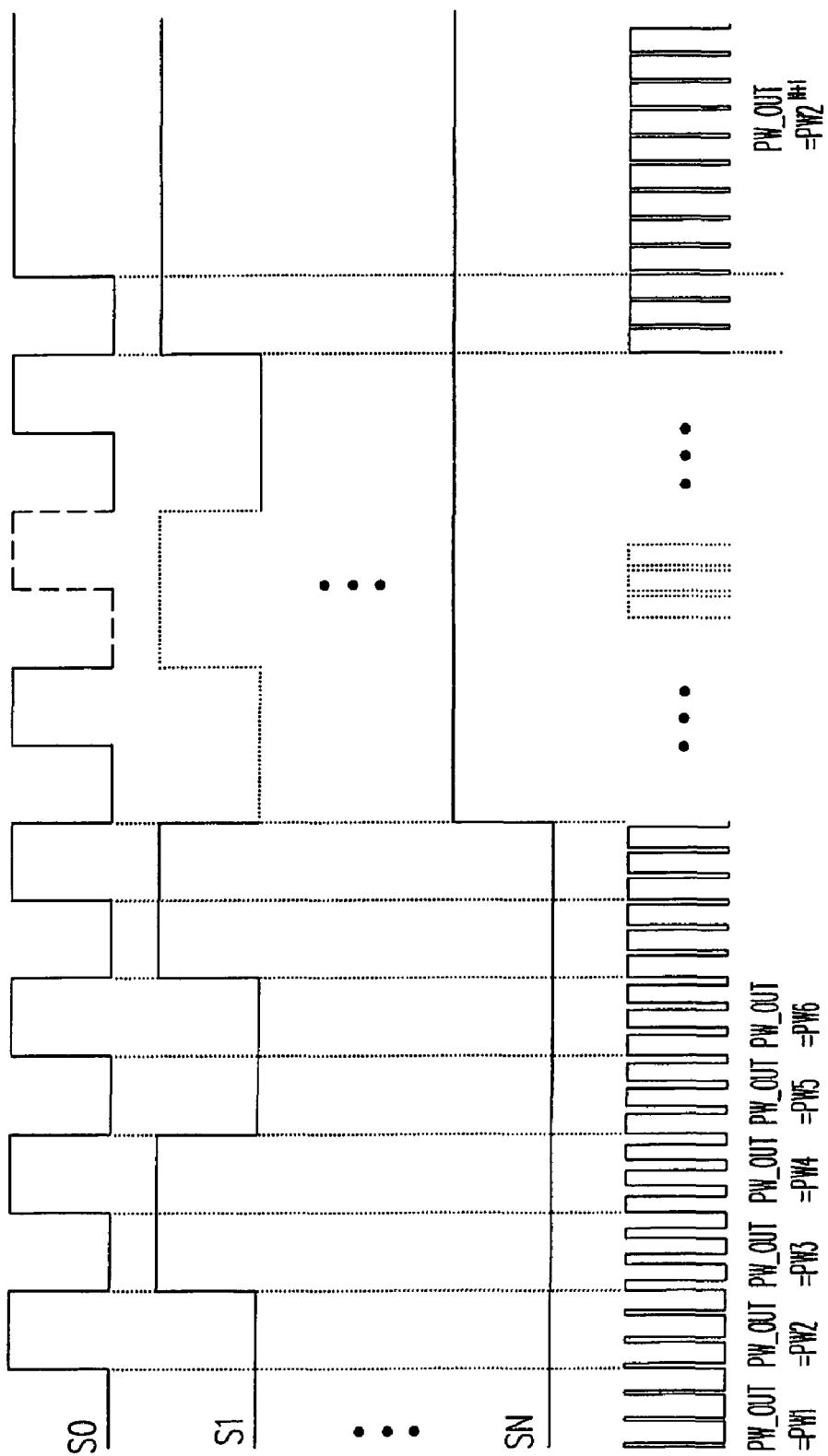
FIG. 9 illustrates pulse signal waveforms generated by the multiplexer.

The pulse signal PW1 is received by an input terminal of the switch 802_1, and the signals S0 through SN determine whether to output the pulse signal PW1 as PW_OUT. The pulse signal PW2 is received by an input terminal of the switch 802_2, and the signals S0 through SN determine whether to output the pulse signal PW2 as PW_OUT. Similarly, in such a way, the output pulse signal PW_OUT is selected as PW1, or PW2, ..., or PW2$^{N+1}$. Referring to FIG. 9, there is shown timing diagram of the pulse signal. As shown in FIG. 9, for example when S0, S1, ..., SN are all logic low, the output pulse signal PW_OUT is the pulse signal PW1. When stable, the output pulse signal PW_OUT is PW2$^{N+1}$. The duty cycle of the pulse signal is restricted to be within a range of an upper limit of $D_{MAX}$<100% and a lower limit of $D_{MIN}$=0.

Figure 10:
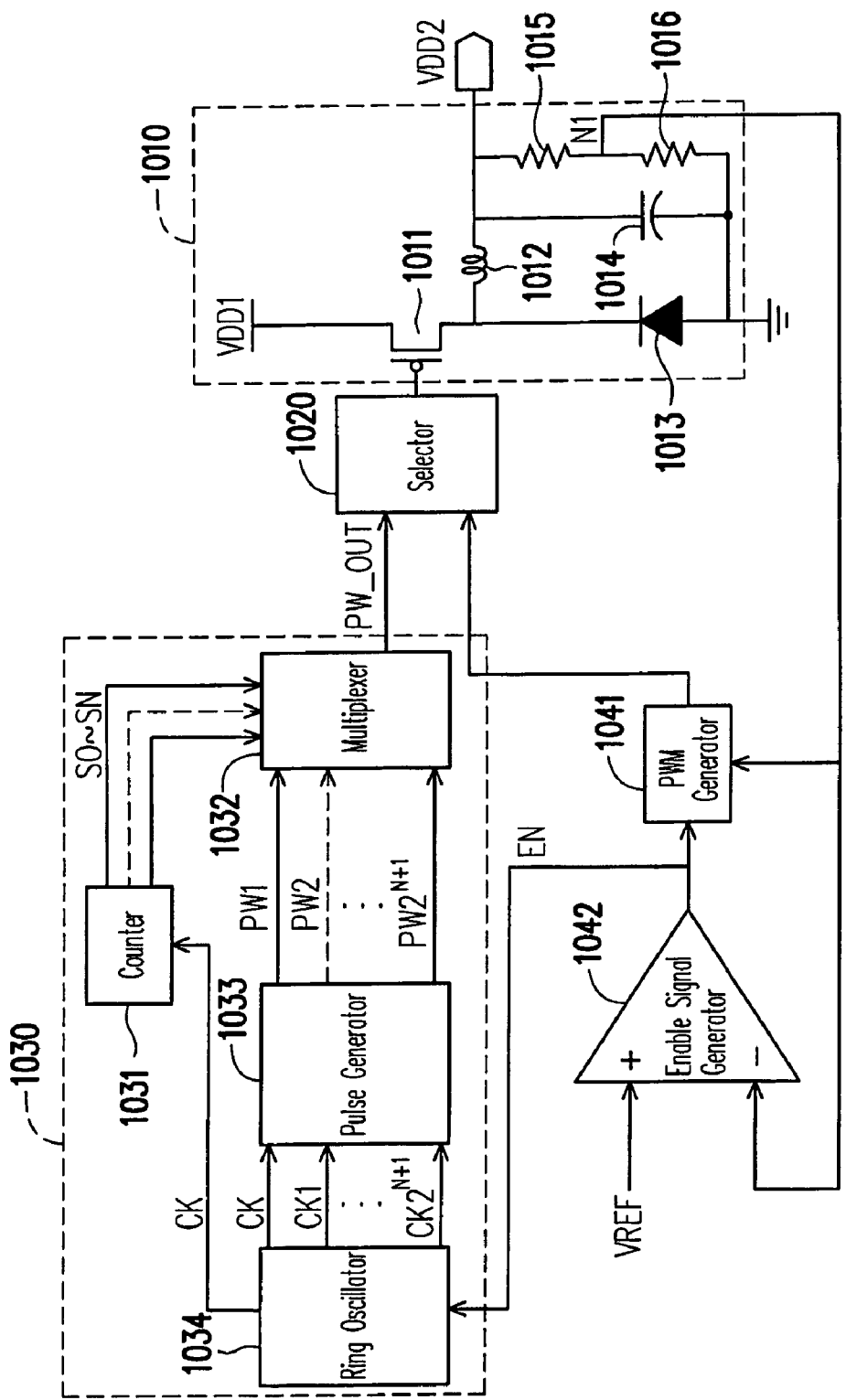
FIGS. 10 through 12 illustrate other embodiments of the present invention, respectively.
Figure 11:
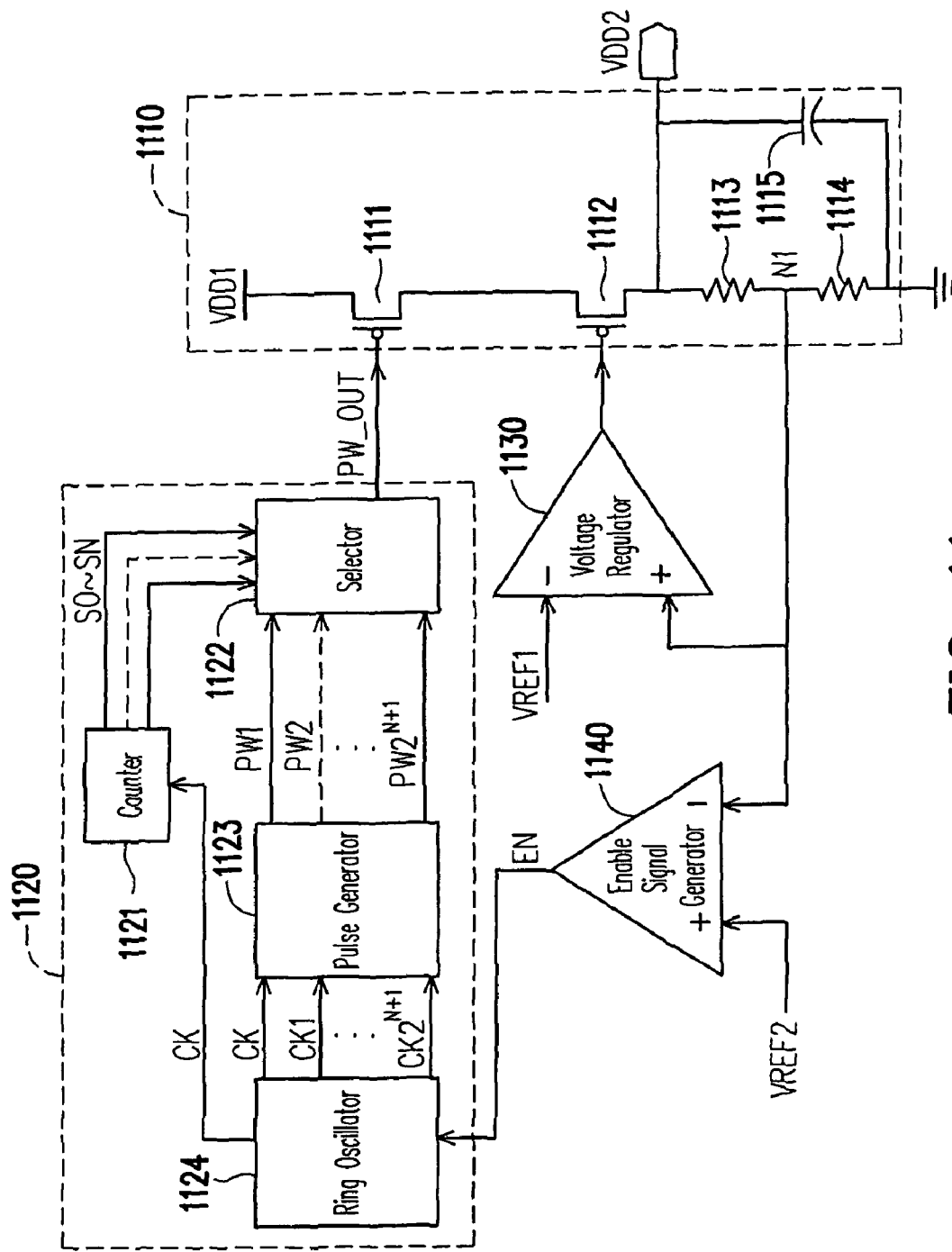
Figure 12:
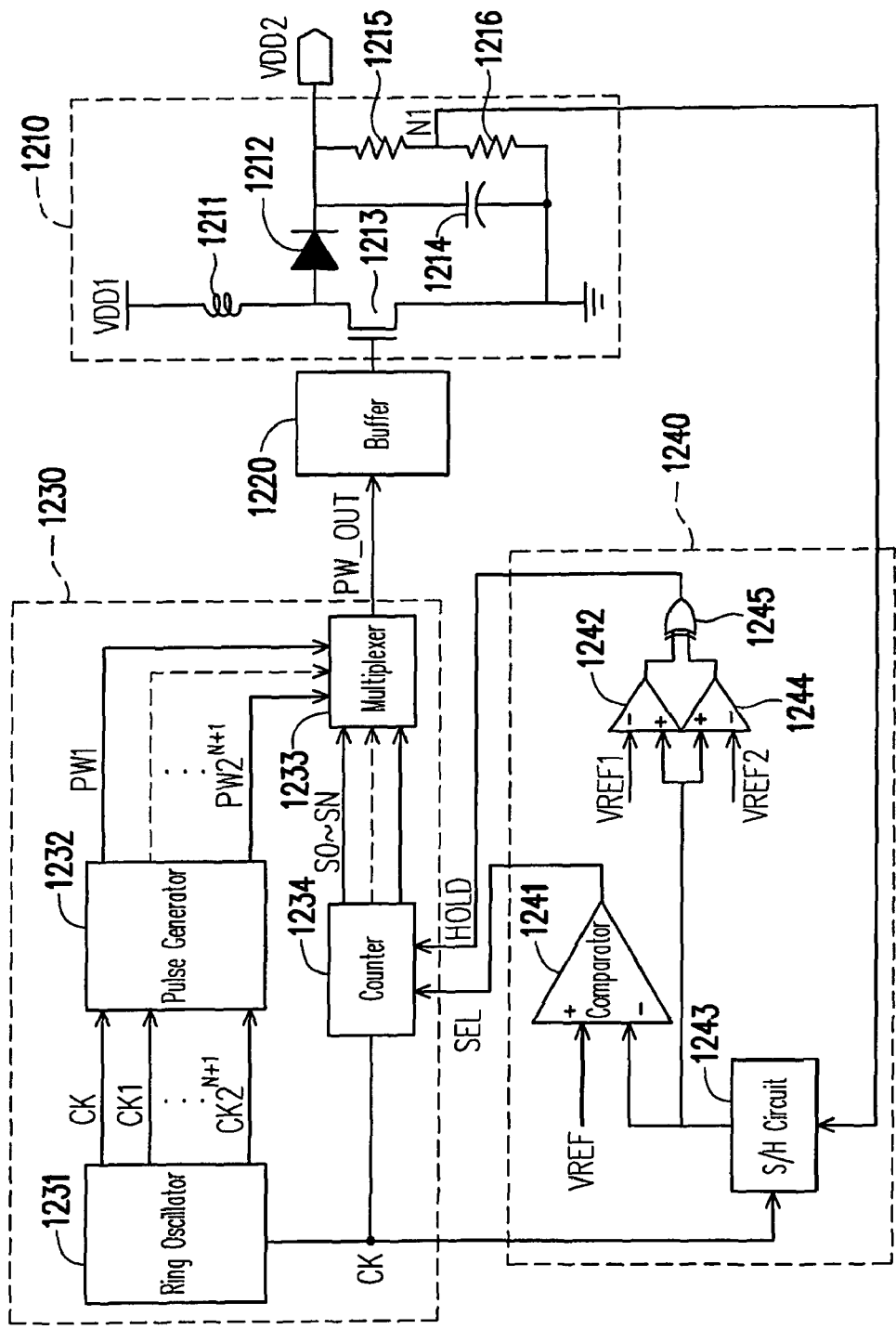

FIGS. 10 through 12 illustrate other embodiments of the present invention, respectively. Those skilled in the art should be aware that the spirit of the present invention is not restricted by the embodiments. FIG. 10 illustrates a power supply system 1000. The power supply system 1000 includes a voltage conversion module 1010, a selector 1020, a soft-start circuit 1030, a PWM generator 1041, and an enable signal generator 1042. The soft-start circuit 1030 includes a counter 1031, a multiplexer 1032, a pulse generator 1033, and a ring oscillator 1034.

The power conversion module 1010 includes an input terminal coupled to an output terminal of the selector 1020. A voltage division point N1 of the power conversion module 1010 is coupled to a negative input terminal of the enable signal generator 1042 and an input terminal of the PWM generator 1041. The selector 1020 selects a pulse signal outputted form the soft-start circuit 1030 or a PWM signal generated by the PWM generator 1041. Controlled by the signal selected by the selector 1020, the voltage conversion module 1010 converts the voltage supply VDD1 to an output voltage supply VDD2.

A positive input terminal of the enable signal generator 1042 is coupled to a reference voltage VREF, while the negative input terminal thereof is coupled to the voltage division point N1 of the voltage conversion module 1010. An output terminal of the enable signal generator 1042 generates an enable signal EN, and transmits the enable signal EN to the ring oscillator 1034 and an input terminal of the PWM generator 1041. An input terminal of the PWM generator 1041 is coupled to an output terminal of the enable signal generator 1042, and another input terminal of the PWM generator 1041 is coupled to the voltage division point N1 of the voltage conversion module 1010. An output terminal of the PWM generator 1041 is coupled to the input terminal of the selector 1020.

The voltage conversion module 1010 includes a transistor 1011, an inductor 1012, a diode 1013, a capacitor 1014, and two resistors 1015 and 1016. The transistor 1011 include a source electrode coupled to the voltage supply VDD1, a gate electrode coupled to the selector 1020, and a drain electrode coupled to a first terminal of the inductor 1012 and a cathode of the diode 1013.

An anode of the diode 1013 is coupled to GND, and the cathode of the diode 1013 is coupled to the first terminal of the inductor 1012 and the drain electrode of the transistor 1011. The first terminal of the inductor 1012 is coupled to the drain electrode of the transistor 1011 and the cathode of the diode 1013, and a second terminal of the inductor 1012 is coupled to a first terminal of the capacitor 1014 and a first terminal of the resistor 1015.

The first terminal of the capacitor 1014 is coupled to the first terminal of the resistor 1015 and the second terminal of the inductor 1012, and provides the output voltage supply VDD2. A second terminal of the capacitor 1014 is coupled to GND. The first terminal of the resistor 1015 is coupled to the output voltage supply VDD2, and a second terminal of the resistor is coupled to the voltage division point N1. A first terminal of the resistor 1016 is coupled to the voltage division point N1, and a second terminal of the resistor 1016 is coupled to GND.

The soft-start circuit 1030 receives the enable signal EN. The ring oscillator 1034 generates clock signals CK, CK1 ... CK2$^{N+1}$. The clock signal CK is inputted into the counter 1031. The clock signals CK1 ... CK2$^{N+1}$ are inputted into the pulse generator 1033. The counter 1031 generates signals S0 through SN, and the pulse generator 1033 generates pulse signals PW1, PW2, ... and PW2$^{N+1}$. The multiplexer selects one from the pulse signals pulse signals PW1, PW2, ..., PW2$^{N+1}$ to be as the pulse signal PW_OUT.

FIG. 11 is a circuit block diagram of a power supply system according to another embodiment of the present invention. The power supply system 1100 includes a voltage conversion module 1110, a soft-start circuit 1120, an enable signal generator 1140, and a voltage regulator 1130. According to a pulse signal generated by the soft-start circuit 1120 or a bias signal generated by the voltage regulator 1130, the voltage conversion module 1110 converts the voltage supply VDD1 into an output voltage supply VDD2. After the output voltage supply VDD2 becomes good for operating, all transistors 1111 in the voltage conversion module 1110 are in strong conduction, and meanwhile the voltage regulator 1130 regulates a gate voltage of the transistor 1112 so as to convert the voltage supply VDD1 into the output voltage supply VDD2.

The enable signal generator 1140 compares the reference voltage VREF2 and the node voltage N1, and the comparison result, i.e. the enable signal EN, is inputted into the soft-start circuit 1120. The voltage regulator 1130 compares the reference voltage vREF1 and the node voltage N1, and the comparison result is inputted as the bias signal to the gate electrode of the transistor 1112 of the voltage conversion module 1110.

The voltage conversion module 1110 includes transistors 1111 and 1112, resistors 1113 and 1114, and a capacitor 1115. The transistor 1111 includes a source electrode coupled to the voltage supply DVV1, a gate electrode receiving the pulse signal PW_OUT generated by the soft-start circuit 1120, and a drain electrode coupled to a source electrode of the transistor 1112.

The transistor 1112 includes a source electrode coupled to the drain electrode of the transistor 1111, a gate electrode receiving the bias signal generated by the voltage regulator 1130, and a drain electrode coupled to a first terminal of the resistor 1113, the output voltage supply VDD2, and a first terminal of the capacitor 1115.

The resistor 1113 includes the first terminal coupled to the output voltage supply VDD2 and the drain electrode of the transistor 1112, and a second terminal coupled to the first terminal of the resistor 1114 (i.e. the voltage division point N1), the positive input terminal of the voltage regulator 1130 and the negative input terminal of the enable signal generator 1140.

The resistor 1114 includes a first terminal, i.e., the voltage division point N1, coupled to the positive input terminal of the voltage regulator 1130 and the negative input terminal of the enable signal generator 1140, and a second terminal coupled to the second terminal of the capacitor 1115 and GND. The first terminal of the capacitor 1115 is coupled to the output voltage supply VDD2, the first terminal of the resistor 1113, and the drain electrode of the transistor 1112, and the second terminal of the capacitor 1115 is coupled to the second terminal of the resistor 1114, i.e., GND.

The soft-start circuit 1120 includes a counter 1121, a multiplexer 1122, a pulse generator 1123, and a ring oscillator 1124.

FIG. 12 is a circuit block diagram illustrating a digital control power supply system according to another embodiment of the present invention. The power supply system 1200 includes a voltage conversion module 1210, a buffer 1220, a digitally controlled power conversion circuit 1230, and a selection mode signal generator 1240. The digitally controlled power conversion circuit 1230 includes a ring oscillator 1231, a pulse generator 1232, a multiplexer 1233, and a counter 1234.

The digitally controlled power conversion circuit 1230 generates a pulse signal PW_OUT and transmits the pulse signal PW_OUT to the buffer 1220. The buffer 1220 then transmits the pulse signal PW_OUT to the voltage conversion module 1210. Controlled by the pulse signal PW_OUT, the voltage conversion module 1210 converts a voltage supply VDD1 into a required output voltage supply VDD2. A voltage division point N1 of the voltage conversion module 1210 is coupled to the selection mode signal generator 1240. The selection mode signal generator 1240 is adapted to control an operation mode of the digitally controlled power conversion circuit 1230. For example, a setting signal SEL and a hold signal HOLD generated by the selection mode signal generator 1240 are capable of controlling operation mode of the counter 1234 of the digitally controlled power conversion circuit 1230. In such a way, the pulse signal outputted from the digitally controlled power conversion circuit 1230 can be controlled thereby.

The voltage conversion module 1210 includes an inductor 1211, a diode 1212, a transistor 1213, a capacitor 1214, and two resistors 1215, and 1216. The inductor 1211 includes a first terminal coupled to the voltage supply VDD1, and a second terminal coupled an anode of the diode 1212 and a drain electrode of the transistor 1213.

The anode of the diode 1212 is coupled to the drain electrode 1213 and the second terminal of the inductor 1211. A cathode of the diode 1212 is coupled to the capacitor 1214, a first terminal of the resistor 1215, and the output voltage supply VDD2.

The transistor 1213 includes a source electrode coupled to GND, a gate electrode coupled to an output terminal of the buffer 1220, and a drain electrode coupled to the second terminal of the inductor 1211, and the anode of the diode 1212.

A first terminal of the capacitor 1214 is coupled to the first terminal of the resistor 1215, the output voltage supply VDD2, and the cathode of the diode 1212. A second terminal of the capacitor 1214 is coupled to GND.

The first terminal of the resistor 1215 is coupled to the first terminal of the capacitor 1214, the cathode of the diode 1212, and the output voltage supply VDD2. The second terminal of the resistor 1215 is the voltage division point N1. The voltage division point N1 is coupled to an input terminal of a sample and hold circuit 1243 of the selection mode signal generator 1240. A first terminal of the resistor 1216 is also the voltage division point N1, and a second terminal of the resistor 1216 is coupled to GND.

In the digitally controlled power conversion circuit 1230, the counter 1234 is adapted to up-count or down-count. When the output voltage supply VDD2 is lower than a regulation voltage, the counter 1234 up-counts, wherein a pulse width of the pulse signal PW_OUT increases as time going on. It should be noted that the pulse width of the pulse signal PW_OUT has an upper limit which is required to be less than 100%, preferably 90%. When the output voltage supply VDD2 is higher than the regulation voltage, the counter 1234 down-counts, wherein the pulse width of the pulse signal PW_OUT decreases as time going on. It should be noted that the pulse width of the pulse signal PW_OUT has a lower limit for example 0%. Up-count or down-count of the counter 1234 is controlled by the setting signal SEL. For example, when the setting signal SEL of the selection mode signal generator 1240 is logic low, the counter 1234 down-counts. When the setting signal SEL of the selection mode signal generator 1240 is logic high, the counter 1234 up-counts.

Further, the hold signal HOLD from the selection mode signal generator 1240 determines an operation mode of the counter 1234. When the hold signal HOLD from the selection mode signal generator 1240 is logic low, the counter 1234 operates at normal mode. When the hold signal HOLD from the selection mode signal generator 1240 is logic high, the outputs of counter 1234 keep the previous logic. In such a way, the duty of the pulse signal PW_OUT outputted from the multiplexer 1233 can be kept.

The selection mode signal generator 1240 includes comparators 1241, 1242, and 1244, a sample and hold circuit 1243 and an exclusive OR gate 1245. The sample and hold circuit 1243 includes a first input terminal coupled to the voltage division point N1 of the voltage conversion module 1210, a second input terminal for receiving the clock signal CK, and an output terminal coupled to a negative input terminal of the comparator 1241 and two positive input terminals of the comparator 1242.

The comparator 1241 includes a positive input terminal coupled to a reference voltage VREF, the negative input terminal coupled to the output terminal of the sample and hold circuit 1243, and an output terminal for outputting the setting signal SEL to the counter 1234.

A positive input terminal of the comparator 1242 and an input terminal of the comparator 1244 are coupled to the negative input terminal of the comparator 1241 and the output terminal of the sample and hold circuit 1243. The negative input terminal of the comparator 1242 is coupled to the reference voltage VREF1. A negative input terminal of the comparator 1244 is coupled to another reference voltage VREF2. The two output terminals of the comparators 1242 and 1244 are coupled to two input terminals of the exclusive OR gate 1245 respectively.

Two input terminals of the exclusive OR gate 1245 are coupled to the output terminals of the comparators 1242 and 1244 respectively. An output terminal of the exclusive OR gate 1245 outputs the hold signal HOLD to the counter 1234. When the output voltage supply VDD2 approximates to a rated voltage, a duty cycle of the pulse signal PW_OUT can be sustained stable by the hold signal HOLD.

For convenience of illustration, the operation principles of the soft-start circuits and the digitally controlled power conversion circuit as shown in FIGS. 10 through 12 which are equivalent or similar to that of the first embodiment are not to be iterated hereby. However, it should be noted that the duty cycle of the pulse signal generated by the multiplexer of the soft-start circuit and the digitally controlled power conversion circuit as discussed above should be within a range defined by an upper limit $D_{MAX}$<100%, and a lower limit $D_{MIN}$=0. Those of ordinary skill in the art may be taught to obtain a soft-start circuit system without external capacitors according to the teachings given in association with FIGS. 10 through 12.

In summary, as taught in the foregoing embodiments, the present invention does not employ external capacitors in generation of the PWM signal, so that external capacitors are unnecessary and the circuit area thereof can be saved. Further, the soft-start circuit system is digital, so as to be able to work under low voltage supply, e.g., less than 1V.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A full digital soft-start circuit, adapted for a power supply system, the full digital soft-start circuit comprising:
   a ring oscillator, adapted for generating a plurality of clock signals which are different in phase, while equivalent in duty cycle and frequency, according to an enable signal;
   a pulse generator, coupled to the ring oscillator, adapted for performing a digital logical operation, so as to generate a plurality of pulse signals with different duty cycles;
   a counter, coupled to the ring oscillator, and adapted for counting according to a corresponding one of the clock signals generated by the ring oscillator and thus generating a multi-bit counting signal, wherein the counter affects a soft-start time of the full digital soft-start circuit; and
   a multiplexer, coupled to the pulse generator and the counter, wherein the multiplexer determines whether to transmit the pulse signals with different duty cycles generated by the pulse generator, according to the counting signal generated by the counter, so as to generate an output pulse which duty cycle increases as time going on.

2. The full digital soft-start circuit according to claim 1, wherein the ring oscillator comprises:
   a first transistor, controlled by the enable signal;
   a second transistor, controlled by the enable signal;

an inverter, coupled to the first transistor and the second transistor, for receiving and inverting the corresponding one of the clock signals; and a plurality of serially connected inversion delay units, for receiving an output signal from the inverter, the inversion delay units outputting the clock signals.

3. The full digital soft-start circuit according to claim 1, wherein the ring oscillator comprises:

a plurality of serially connected differential signal output inverters, adapted for generating the clock signals according to the enable signal and a frequency control voltage.

4. The full digital soft-start circuit according to claim 1, wherein the pulse generator comprises a plurality of digital exclusive OR gates, wherein each of the digital exclusive OR gates performs a digital logic operation on two of the clock signals generated by the ring oscillator, so as to generate the pulse signals.

5. The full digital soft-start circuit according to claim 1, wherein the counter comprises a plurality of flip-flops, a part of which being adapted for affecting a counting cycle and the rest of the flip-flops are adapted for generating the counting signal, wherein when all bits of the counting signal are at logic high, the counter stops counting and all bits of the counting signal are sustained at logic high.

6. The full digital soft-start circuit according to claim 1, wherein the multiplexer comprises: a plurality of inverters and a plurality of switches, each of the inverters being adapted for inverting a bit of the counting signal, and the switches being adapted for selecting one of the pulse signals generated by the pulse generator according to the bits of the counting signal and the inverted bits, as the output pulse.

7. A power supply system, comprising:

a full digital soft-start circuit, operated with a reference voltage supply, the full digital soft-start circuit being adapted for generating an output pulse which duty cycle increases as time going on in response to an enable signal;

a first pulse generator, operated under an output voltage supply, wherein the first pulse generator is adapted for generating a pulse width modulation (PWM) signal;

a selector, coupled to the fully digital soft-start circuit and the first pulse generator, for receiving the output pulse and the PWM signal so as to select and output one of the output pulse and the PWM signal; and a voltage conversion module, coupled to the selector, for generating the output voltage supply in response to the output of the selector, wherein when the power supply system initializes, the selector selects to transmit the output pulse generated by the full digital soft-start circuit to the voltage conversion module and then the voltage conversion module generates the output voltage supply according to the output pulse; and when the output voltage supply generated by the power conversion module becomes stable, the selector selects to transmit the PWM signal generated by the first pulse generator to the voltage conversion module and then the voltage conversion module generates the output voltage supply according to the PWM signal.

8. The power supply system according to claim 7, wherein the full digital soft-start circuit comprises:

a ring oscillator, adapted for generating a plurality of clock signals which are different in phase, while equivalent in duty cycle and frequency;

a second pulse generator, adapted for generating a plurality of pulse signals with different duty cycles according to the clock signals generated by the ring oscillator;

a counter, adapted for counting according to a corresponding one of the clock signals generated by the ring oscillator, and thus generating a multi-bit counting signal; and a multiplexer, determining how to transmit the pulse signals generated by the second pulse generator according to the counting signal generated by the counter, and thus generating the output pulse which duty cycle increases as time going on.

9. The power supply system according to claim 8, wherein the oscillator comprises:

a first transistor, controlled by the enable signal;

a second transistor, controlled by the enable signal;

an inverter, coupled to the first transistor and the second transistor, for receiving and inverting the corresponding one of the clock signals; and a plurality of serially connected inversion delay units, for receiving an output signal from the inverter, the inversion delay units outputting the clock signals.

10. The power supply system according to claim 8, wherein the ring oscillator comprises:

a plurality of serially connected differential signal output inverters, adapted for generating the clock signals according to the enable signal and a frequency control voltage.

11. The power supply system according to claim 8, wherein the second pulse generator comprises a plurality of digital exclusive OR gates, wherein each of the digital exclusive OR gates performs a digital logic operation on two of the clock signals generated by the ring oscillator, so as to generate the pulse signals.

12. The power supply system according to claim 8, wherein the counter comprises a plurality of flip-flops, a part of which being adapted for affecting a counting cycle and the rest of the flip-flops are adapted for generating the counting signal, wherein when all bits of the counting signal are at logic high, the counter stops counting and all bits of the counting signal are sustained at logic high.

13. The power supply system according to claim 8, wherein the multiplexer comprises: a plurality of inverters and a plurality of switches, each of the inverters being adapted for inverting a bit of the counting signal, and the switches being adapted for selecting one of the pulse signals generated by the pulse generator according to the bits of the counting signal and the inverted bits, as the output pulse.

14. The power supply system according to claim 7, wherein the voltage conversion module comprises a voltage lowering module.

15. The power supply system according to claim 7, further comprising an enable signal generator, for generating the enable signal which controls the full digital soft-start circuit in response to a reference voltage and a node voltage corresponding to the output power supply and provided by the voltage conversion module.

16. A power supply system, comprising:

a digitally controlled power conversion circuit, operated under a reference voltage supply, the digitally controlled power conversion circuit being adapted for generating an output pulse which duty cycle increases or decreases as time going on in response to a setting signal;

a selection mode signal generator, coupled to the digitally controlled power conversion circuit, for generating the setting signal in response to a node voltage corresponding to an output power supply and a first clock signal;

a buffer, coupled to the digitally controlled power conversion circuit, for buffering and outputting the output pulse; and a voltage conversion module, coupled to the selection mode signal generator and the buffer, adapted for converting the reference voltage supply to generate the output voltage supply in response to the output of the buffer so as to provide the node voltage accordingly.

17. The power supply system according to claim 16, wherein the digitally controlled power conversion circuit comprises:
a ring oscillator, adapted for generating a plurality of clock signals which are different in phase, while equivalent in duty cycle and frequency;
a pulse generator, adapted to generate a plurality of pulse signals with different duty cycles according to the clock signals generated by the ring oscillator;
a counter, adapted for counting according to a corresponding the first clock signal of the clock signals generated by the ring oscillator and thus generating a multi-bit counting signal, wherein the counter has at least two operation modes, wherein when the counter operates under one of the two operation modes, the duty cycle of the pulse signals generated by the pulse generator gradually ascends; and when the counter operates under another of the two operation modes, the duty cycles of the pulse signals generated by the pulse generator gradually descends; and
a multiplexer, determining how to transmit the pulse signals generated by the pulse generator according to the counting signal generated by the counter, so as to generate the output pulse which duty cycle increases or decreases as time going on.

18. The power supply system according to claim 17, wherein the pulse generator comprises a plurality of digital exclusive OR gates, wherein each of the digital exclusive OR gates performs a digital logic operation on two of the clock signals generated by the ring oscillator, so as to generate the pulse signals.

19. The power supply system according to claim 17, wherein the multiplexer comprises: a plurality of inverters and a plurality of switches, each of the inverters being adapted for inverting a bit of the counting signal, and the switches being adapted for selecting one of the pulse signals generated by the pulse generator according to the bits of the counting signal and the inverted bits, as the output pulse.

20. A power supply system, comprising:
a full digital soft-start circuit, operated under a reference voltage supply, the full digital soft-start circuit being adapted for generating an output pulse which duty cycle increases as time going on in response to an enable signal;
a voltage regulator, operated under the output voltage supply, for generating a bias signal in response to a first reference voltage and a node voltage corresponding to an output voltage supply;
an enable signal generator, coupled to the full digital soft-start circuit, for generating the enable signal for controlling the full digital soft-start circuit in response to a second reference voltage and the node voltage; and
a voltage conversion module, coupled to the full digital soft-start circuit, the voltage regulator and the enable signal generator, for generating the output voltage supply in response to the output pulse and the bias signal so as to provide the node voltage accordingly,
wherein when the output voltage supply is not yet stable, the voltage conversion module converts the reference voltage supply into the output voltage supply according to the output pulse generated by the full digital soft-start circuit; and
when the output voltage supply becomes stable, the voltage conversion module is adjusted by the bias signal generated by the voltage regulator and then the voltage conversion module converts the reference voltage supply into the output voltage supply.

21. The power supply system according to claim 20, wherein the full digital soft-start circuit comprises:
a ring oscillator, adapted for generating a plurality of clock signals which are different in phase, while equivalent in duty cycle and frequency;
a pulse generator, adapted for generating a plurality of pulse signals with different duty cycles according to the clock signals generated by the ring oscillator;
a counter, adapted for counting according to a corresponding one of the clock signals generated by the ring oscillator, and thus generating a multi-bit counting signal; and
a multiplexer, determining how to transmit the pulse signals generated by the pulse generator according to the counting signal generated by the counter, and thus generating the output pulse which duty cycle increases as time going on.

22. The power supply system according to claim 21, wherein the oscillator comprises:
a first transistor, controlled by the enable signal;
a second transistor, controlled by the enable signal;
an inverter, coupled to the first transistor and the second transistor, for receiving and inverting the corresponding one of the clock signals; and
a plurality of serially connected inversion delay units, for receiving an output signal from the inverter, the inversion delay units outputting the clock signals.

23. The power supply system according to claim 21, wherein the ring oscillator comprises:
a plurality of serially connected differential signal output inverters, adapted for generating the clock signals according to the enable signal and a frequency control voltage.

24. The power supply system according to claim 21, wherein the pulse generator comprises a plurality of digital exclusive OR gates, wherein each of the digital exclusive OR gates performs a digital logic operation on two of the clock signals generated by the ring oscillator, so as to generate the pulse signals.

25. The power supply system according to claim 21, wherein
the counter comprises a plurality of flip-flops, a part of which being adapted for affecting a counting cycle and the rest of the flip-flops are adapted for generating the counting signal, wherein when all bits of the counting signal are at logic high, the counter stops counting and all bits of the counting signal are sustained at logic high; and
the multiplexer comprises a plurality of inverters and a plurality of switches, each of the inverters being adapted for inverting a bit of the counting signal, and the switches being adapted for selecting one of the pulse signals generated by the pulse generator according to the bits of the counting signal and the inverted bits, as the output pulse.

* * * * *